March 7, 1939. H. L. PROUT 2,149,360
PORTABLE LINE LEVELING DEVICE
Filed Oct. 1, 1937
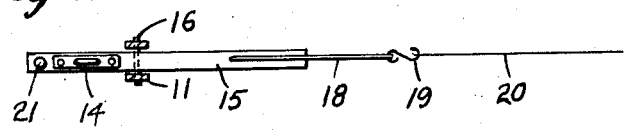
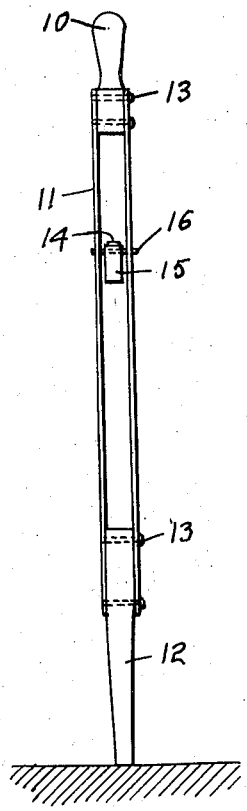
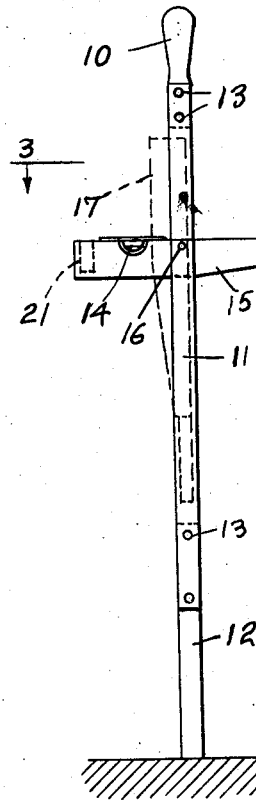
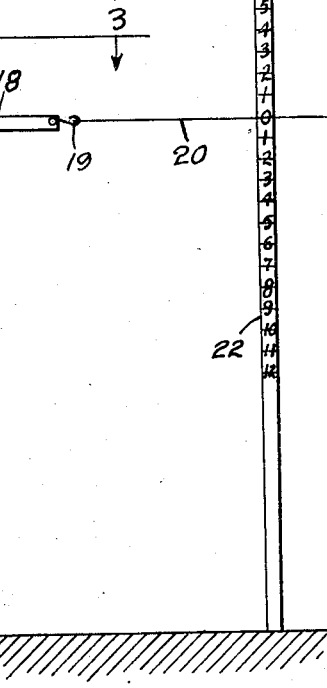
INVENTOR.
HERBERT L. PROUT
BY
ATTORNEY.

Patented Mar. 7, 1939

2,149,360

UNITED STATES PATENT OFFICE 2,149,360

PORTABLE LINE LEVELING DEVICE

Herbert L. Prout, Elkhart, Ind.

Application October 1, 1937, Serial No. 166,843

1 Claim. (Cl. 33—207)

This invention relates to leveling instruments of the type designed to establish a true horizontal line at a distance above the ground.

The common builder's level requires considerable time to set up and adjust on its tripod; also it is a rather delicate instrument for the rough handling it is apt to get on construction jobs. The line levels now in use, in which the level is suspended from a stretched line, are inaccurate because the weight of the level deflects the line and gives an unreliable result.

An object of this invention therefore, is to provide an accurate leveling device which is instantly available, and can be easily carried from place to place, and requires substantially no time for setting up and adjusting.

Another object is to provide a rough and ready device which can be used in out of the way places, such as at the bottom of excavations, trenches, etc., where a tripod level would be very inconvenient.

A further object of the invention is to provide a leveling instrument for use by builders, masons, plumbers, etc., also to improve line leveling devices in other respects hereinafter specified and claimed.

Reference is to be had to the accompanying drawing forming a part of this specification, in which Fig. 1 is an elevation of the improved leveling instrument in use, Fig. 2 is an elevation of the device at right angles to the view shown in Fig. 1, and Fig. 3 is a sectional plan view of the device, taken on line 3—3 of Fig. 1.

Referring to the drawing by numerals, a main staff consists of a handle 10, of wood, aluminum, or other suitable material, a bottom section 12, preferably of wood, and a center section of two spaced parallel metal bars 11, bolted to, and joining the top and bottom sections 10 and 12 by means of bolts 13. The staff is to be of convenient height for holding in the hand similar to a walking stick, or approximately 35" long.

A spirit level 14 is suitably housed in a wood or aluminum level frame 15 so as to be easily observed by the operator, said frame being pivotally mounted between the bars 11, by means of a slender steel pin or rod 16 passing loosely through bars 11 and held tightly in frame 15. This pivot pin is located in bars 11 exactly twenty-four inches (or some other definite even figure) above the bottom end of the staff section 12. The bars 11 are of such length as to permit the level to be folded securely between them as shown by dotted lines 17, for convenience in carrying. A suitable lock or rubber band may be provided for holding the frame 15 in folded position.

One end of the level frame 15 carries an extension or arm 18 of suitable length, and carrying at its outer end a hook 19 for attaching a cord or line 20. The other end of the level frame 15 may be provided with a counterweight 21 such as a lead slug; and the pivot pin 16 is arranged to pass exactly through the center of gravity of the whole level members so that it will exactly balance about said pivot pin.

To use this leveling device the operator places the staff firmly on the ground or some point of reference, holding same in approximately vertical position. His assistant stretches the line 20 toward the spot to be leveled and holds a rule or measuring rod upright on said spot. He then raises or lowers his end of the line, as directed by the operator, until the level position of the cord is attained. He then observes the reading on the upright rule where crossed by the stretched line. If exactly 24 inches, the two points are level. If more or less than 24 inches, the two points are out of level by a corresponding amount.

A special rod 22 may be used instead of the rule, with the zero mark exactly 24 inches from the lower end, and graduated above and below in inches or other suitable markings, to give the relative elevations directly, without any calculation on the part of the operator. This rod will be especially useful for laying drains or sewer pipe, where a definite uniform pitch is required.

I would state in conclusion that while the illustrated example constitutes a practical embodiment of my invention, I do not wish to limit myself precisely to these details, since manifestly the same may be considerably varied without departing from the spirit of the invention as defined in the appended claim.

Having thus described my invention, I claim as new and desire to secure by Letters Patent:

In a leveling device, a pair of elongated staff members in spaced substantially parallel relation, a lever pivotally mounted between said members, a spirit level mounted on said lever, and means for connecting a line to one end of said lever, said lever being arranged to fold between said members in inoperative position for transportation purposes.

HERBERT L. PROUT.